United States Patent Office 3,711,541
Patented Jan. 16, 1973

---

3,711,541
PREPARATION OF PHOSPHONYL DIHALIDES
Nathan D. Field, Allentown, and David I. Randall and Calvin Vogel, Easton, Pa., assignors to GAF Corporation, New York, N.Y.
No Drawing. Filed July 14, 1969, Ser. No. 841,574
Int. Cl. C07f 9/42
U.S. Cl. 260—543 P         9 Claims

ABSTRACT OF THE DISCLOSURE 2-haloethyl phosphonyl dihalides are prepared by the reaction of ethylene and phosphorus oxyhalides in the presence of a catalyst.

BACKGROUND OF THE INVENTION

Field of the invention

This invention relates to a process for the preparation of 2-haloethylphosphonyl dihalides from ethylene and a phosphorus oxyhalide in the presence of a catalyst.

Description of the prior art

2 - haloethylphosphonyl dihalides and specifically 2-chloroethylphosphonyl dichloride, are products known in the art as useful in various fields particularly as intermediate products useful for various chemical synthesis such as for example the preparation of esters, amides and the like. Due to their phosphorus content, compounds of this kind are important in various applications in that they have a fungicidal effect and can be used as pesticides for plants. In addition, 2-chloro-ethylphosphonyl dichloride is an important additive in the preparation of difficultly inflammable polyesters. Also, by splitting off hydrogen chloride, it may be converted into vinyl phosphonic acid dichloride which, because of its double bond, can be polymerized and copolymerized to prepare important polymeric products. Moreover, its most important use is as an intermediate for the preparation of 2-chloroethylphosphonic acid by hydrolysis, this product being a plant growth stimulant.

Various procedures are known in the art for the preparation of these compounds. Thus, it has been suggested in U.S. Patent 3,206,508 that ethylene, phosphorus, trichloride and oxygen will react in the liquid phase to provide the 2- chloroethylphosphonyl dichloride. However, this procedure is not commercially satisfactory as the reaction conditions are potentially hazardous since they require the contact of large volumes of pure oxygen with highly flammable ethylene.

In addition, an article by M. Asscher et al. J. Chem. Soc., 1964, page 4962, describes the copper chloride catalyzed addition of sulfonyl chlorides to olefins and Murai et al., J. Org. Chem., vol. 31, page 3000 (1966), describes the copper salt catalyzed addition of trichloro and dichloroacetonitriles to olefins. However, there does not appear to be any suggestion in the art for the reaction of ethylene and a phosphorus oxyhalide to form a 2-haloethylphosphonyl dihalide under the conditions described herein.

SUMMARY OF THE INVENTION

It is accordingly one object of this invention to provide a process for the preparation of 2-haloethylphosphonyl dihalides from ethylene and a phosphorus oxyhalide in the presence of a catalyst.

A further object of the invention is to provide a procedure for the preparation of 2-haloethyl phosphonyl dihalides from ethylene, phosphorus oxyhalide and a catalyst wherein the direct contact of large volumes of oxygen and highly flammable ethylene is avoided.

A still further object of the invention is to provide a procedure for the preparation of 2-chloroethylphosphonyl dichloride by the reaction of ethylene, phosphorus oxychloride and a catalyst under moderate reaction conditions.

Other objects and advantages of the invention will become apparent as the description thereof proceeds.

In satisfaction of the foregoing objects and advantages, there is provided by this invention a process for the preparation of 2-haloethylphosphonyl dihalides which comprises contacting a phosphorus oxyhalide with ethylene in the presence of a catalyst at a temperature of about 15–200° C. in a closed system under an ethylene pressure of about 50–1000 p.s.i.g.

DESCRIPTION OF PREFERRED EMBODIMENTS

As indicated above, this invention is concerned with a procedure for the synthesis of 2-haloethylphosphonyl dihalides by the reaction of ethylene and a phosphorus oxyhalide. This reaction may be described according to the following equation:

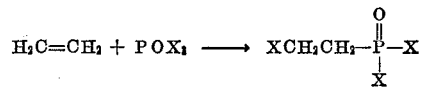

wherein in the above equation, X is a halogen atom, preferably chlorine or bromine.

According to this invention, the reaction of the ethylene and phosphorus oxyhalide is conducted in the presence of a catalyst and preferably in the presence of a solvent. The catalysts which may be employed in this reaction include salts of copper (I) and of copper (II), free radical catalysts and/or mixtures thereof. Thus catalysts which may be used include cupric chloride, cuprous chloride, azo-bis-isobutyronitrile, or any of the other well-known free-radical catalysts, such as the peroxides, hydroperoxides and the like, for example benzoylperoxide, dialkyl peroxides, diacyl peroxides, or the azonitrile catalysts mentioned in U.S. Patent No. 2,471,959. These catalysts are well known in the art and need not be further described here.

Solvents which may be employed in the reaction include the halogenated aliphatic and aromatic hydrocarbons such as methylene chloride, methylene dichloride, chloroform, chlorobenzene, aliphatic and aromatic hydrocarbons such as n-pentane and benzene and the like. Mixtures of these materials may also be used as solvents for the reaction.

In this reaction the phosphorus oxyhalide and catalyst are initially charged to a closed system, preferably an autoclave, at a temperature of about 15–200° C., preferably 75–150° C., and pressurized wtih an excess of ethylene gas to a preferable pressure of about 200 to 400 p.s.i.g. The mixture is initially charged with the ethylene at room temperature or slightly below and then the reaction mixture is heated under the ethylene pressure of about 50–1000 p.s.i.g. at the desired temperature until the reaction is completed. Completion of the reaction will be indicated by failure of the mixture to consume further ethylene. Thereafter the reaction mixture is preferably allowed to cool to about room temperature or below and excess phosphorus oxyhalide is removed by distillation leaving the product in the residue which then may be easily recovered by distillation of the residue.

In conducting the reaction the amount of catalyst which should be employed may range from about 1% up to 15% by weight based on the amount of phosphorus oxyhalide initially employed. In addition, the amount of ethylene to be reacted with the phosphorus oxyhalide will be dependent on the amount of phosphorus oxyhalide present and is easily determined by completion of the takeup period for the ethylene.

The reaction may be conducted as a batch system such as described herein or may be conducted as a continuous flow operation with modification of the invention to achieve the continuous flow procedure being well-known to those skilled in the art.

In the reaction, as the most preferred phosphorus oxyhalide reactant is phosphorus oxychloride, the preferred product resulting from the process of this invention is 2-chloroethylphosphonyl dichloride.

The following examples are given for the purpose of illustrating the process of the invention but are not to be considered as limitative thereon.

EXAMPLE I

A one liter glass lined autoclave was charged with the following recipe:

152 grams (1.0 mole) phosphorus oxychloride
13.8 grams (0.1 mole) triethylamine hydrochloride
13.4 grams (0.1 mole) anhydrous copper (II) chloride
20 ml. acetonitrile
200 ml. methylene chloride The autoclave was then pressurized to 300 p.s.i.g. with ethylene at 19° C. When the temperature was raised to 125° C., ethylene was consumed. After 14 hours the reaction mixture was cooled back to 15° C. It was found that 260 p.s.i.g. ethylene had been consumed. The solvent and excess $POCl_3$ were distilled off and the residue distilled at 1.5–2.0 mm. pressure.

Four fractions were collected; fractions 2 and 3 weighing 10.4 grams, were determined by infrared analysis to be primarily 2-chloroethylphosphonyl dichloride.

EXAMPLE II

The reaction of Example I was repeated except that the catalyst employed was 5 grams of benzoyl peroxide. Using the same reaction conditions and techniques, there was obtained from the residue on distillation middle fractions which were primarily 2-chloroethylphosphonyl chloride.

What is claimed is:

1. A process for the preparation of 2-haloethylphosphonyl dihalides which comprises reacting a phosphorus oxyhalide with ethylene in the presence of a catalyst selected from the group consisting of cuprous salts, cupric salts, free radical catalysts, and mixtures thereof at a temperature of 15° to 200° C. and an ethylene pressure of 50 to 1000 p.s.i.g., until ethylene take-up ceases.

2. A process according to claim 1 wherein the phosphorus oxyhalide is phosphorus oxychloride.

3. A process according to claim 1 wherein the catalyst is selected from the group consisting of cuprous chloride, cupric chloride, azo nitriles, the organic peroxides and mixtures thereof.

4. A process according to claim 1 wherein the reaction is conducted in the presence of a solvent selected from the group consisting of halogenated aliphatic hydrocarbons, halogenated aromatic hydrocarbons, aliphatic hydrocarbons, aromatic hydrocarbons and mixtures thereof.

5. A process according to claim 4 wherein the product is recovered by distilling off the solvent and unreacted phosphorus oxychloride and then distilling the resultant residue.

6. A process according to claim 1 wherein the temperature ranges from 75° to 150° C. during the reaction.

7. A process according to claim 6 wherein the ethylene pressure is maintained at 200–400 p.s.i.g. during the reaction.

8. A process as defined in claim 1 wherein the catalyst is cupric chloride.

9. A process as defined in claim 4 wherein the catalyst is cupric chloride.

References Cited

UNITED STATES PATENTS

| | | | |
|---|---|---|---|
| 3,206,508 | 9/1965 | Vilcsek | 260—543 |
| 2,489,091 | 11/1949 | Kharasch | 204—158 |

FOREIGN PATENTS 1,118,170   7/1962   Germany.

OTHER REFERENCES

Graf, Chem. Ber. 85, 9, 1952.

LORRAINE A. WEINBERGER, Primary Examiner

R. GERSTL, Assistant Examiner